United States Patent

Schaaf

[11] Patent Number: 5,986,688
[45] Date of Patent: Nov. 16, 1999

[54] METHOD AND APPARATUS FOR PRODUCING AN IMAGE ON A PRINTING MEDIUM

[75] Inventor: Horst W. Schaaf, Bellingham, Wash.

[73] Assignee: Cymbolic Sciences International, Inc., Laguna Hills, Calif.

[21] Appl. No.: 08/703,789

[22] Filed: Aug. 27, 1996

[51] Int. Cl.⁶ .................................................. G01R 21/133
[52] U.S. Cl. .......................... 347/252; 347/255; 347/256; 358/298
[58] Field of Search ..................................... 347/255, 256, 347/252; 359/184, 185, 186, 181; 340/619; 382/190; 358/298

[56] References Cited

U.S. PATENT DOCUMENTS

| | | |
|---|---|---|
| 3,636,251 | 1/1972 | Daly et al. . |
| 3,717,769 | 2/1973 | Hubbard et al. ......................... 359/184 |
| 3,741,118 | 6/1973 | Carley . |
| 4,142,191 | 2/1979 | Ward ....................................... 347/256 |
| 4,390,903 | 6/1983 | Pomeroy ................................. 358/480 |
| 4,947,186 | 8/1990 | Calloway et al. ...................... 347/232 |
| 5,041,369 | 8/1991 | Fukui et al. ............................ 430/619 |
| 5,521,738 | 5/1996 | Froberg et al. ........................ 359/185 |
| 5,546,415 | 8/1996 | Delfyett et al. ........................ 382/190 |

Primary Examiner—N. Le
Assistant Examiner—Hai C. Pham
Attorney, Agent, or Firm—Elbie R. de Kock

[57] ABSTRACT

A method of producing an image on a printing medium comprises producing a pulse train of modelocked laser pulses, providing a source of image input data in the form of a series of gate pulse of varible length and modulating the pulse train with reference to the gate pulses to produce a gated pulse train for producing the image on the printing medium. An apparatus for carrying out the method is also provided.

2 Claims, 6 Drawing Sheets

METHOD AND APPARATUS FOR PRODUCING AN IMAGE ON A PRINTING MEDIUM

FIELD OF THE INVENTION

This invention relates to a method and apparatus for producing an image on a printing medium. In particular, it relates to a system using a laser for directly transferring a raster image onto a printing medium, such as a lithographic printing medium.

BACKGROUND OF THE INVENTION

The printing industry has experienced an evolution resulting from efforts to speed up the printing process and at the same time to lower costs. The conventional film transfer to plate scheme simply exposes light sensitive photographic film with light from a low power source and then uses the processed film to transfer the image to a plate. More efficient plate imaging methods have led to the direct imaging of the plates themselves. Although still using relatively low power light sources, these methods require complex plate composition and processing chemistry, and hence, are expensive. In a drive to reduce plate costs, the industry has moved to high power laser light sources as a means of thermally producing the image on the plate. In such applications, use is made of inexpensive coatings that require little or no processing to condition the plate surfaces for printing.

The photo-sensitive emulsions appropriate for coating conventional printing plates are based on photo-polymerization reactions, which require high levels of ultra-violet exposure. The source power required to expose a conventional plate efficiently, with a raster film recorder, is prohibitive using present day technology. A transfer medium is therefore used composed of silver-halide based emulsions which are much more sensitive to longer wavelength light and require significantly reduced levels of exposure to sensitize. After the image has been generated on the transfer medium, it is used as a photographic mask and copied by contacting it to the printing plate and providing exposure from a high intensity ultra-violet flood lamp.

Lasers are the favored light source for many raster recording devices because of their inherent high brightness, but they are limited to known lasing materials which impose a number of design restrictions, such as the choice of available wavelengths. In particular, ultra-violet laser sources are much more difficult to manufacture, and are considerably more costly than longer wavelength lasers. Presently, semi-conductor lasers are the most commercially viable laser, in terms of cost per unit emitting power. However, they are only capable of emitting wavelengths in the near infra-red to red portion of the optical spectrum. For this reason, printing plate manufacturers have recently developed printing plates based on thermally induced material changes that are sensitive to high power, near-infra-red (NIR) exposure instead of ultra-violet.

There are different optical system architectures used to record raster images on to flexible media. One such system is the internal drum scanning system in which a flexible medium is seated against an interior cylindrical mounting surface. A rotating optical element, usually a mirror or prism, which is disposed along the axis of the cylinder, redirects the modulated light beam radially with respect to the cylinder axis, scanning the beam along the cylinder circumference as it spins. The rotating scanner is translated by means of a mechanical carriage transport, which provides the slow scan axis of motion. Many machines in commercial production today employ this basic architecture in one form or another.

Another architecture is the external drum architecture in which a rotating drum carries a light sensitive plate or film clamped or otherwise held against its exterior surface. A writing head moves back and forth along the length of the drum and exposes pixels on the light sensitive recording medium. A major problem with such a system resides in the requirement of having to prevent or compensate for vibration of the large rotating drum. Moreover, because the drum is rotating it is necessary to stop the rotation after complete exposure of the plate or film, remove the latter, mount another and then start up the system again. The throughput of an external drum system is, therefore, relatively slow compared to an internal drum system in which the drum does not rotate.

A major advantage of the internal drum configuration resides in the fact that it does not require the large mass associated with the light sensitive medium to rotate. Consequently, large speeds in such systems may be obtained while still maintaining mechanical accuracy. In addition, the configuration does not suffer from inherent distortion as does the planar recording projection system. The beam is directed through the central axis of the lens elements, and the distance to the recording plane is maintained constant throughout the scan motion. This results in a very simple, robust and inexpensive optical system. However, a single faceted axial optical scanning element, used in an internal drum scanning system, causes the projected image at the recording plane to rotate about the optical axis as the beam scans along the cylinder circumference. If only circular symmetric, single spots are to be projected on to the recording plane this rotation effect is unimportant. Therefore, circular beam lasers are the natural choice for use with an internal drum scanning system.

SUMMARY OF THE INVENTION

According to the invention there is provided a method of producing an image on a printing medium, comprising the steps of producing a pulse train of modelocked laser pulses; providing a source of image input data in the form of a series of gate pulses of variable length; and modulating said pulse train with reference to said gate pulses to produce a gated pulse train for producing the image on the printing medium.

According to one embodiment of the invention, modulating said pulse train with reference to said gate pulses is effected by means of amplifying means, said gate pulses serving to drive said amplifying means by successively applying said gate pulses to the amplifying means, whereby said amplifying means is triggered either to amplify said pulse train during the application of a gate pulse or to block said pulse train during the absence of a gate pulse.

Also according to the invention there is provided an imaging system for producing an image on a printing medium, comprising; oscillator means for producing a pulse train of modelocked diode laser pulses; video signal generator means for receiving input image data and for encoding said image data in the form of a series of gate pulses of variable length; and modulating means for modulating said pulse train with reference to said gate pulses to produce a gated pulse train for producing an image on a printing medium.

Further according to the invention there is provided a method of producing high contrast dots on a printing medium with high gamma behavior, comprising the steps of producing a pulse train of modelocked diode laser pulses; providing a source of image input data in the form of a series of gate pulses of variable length; and modulating said pulse train with reference to said gate pulses to produce a gated pulse train for producing the high contrast dots on the printing medium.

Further objects and advantages of the invention will become apparent from the description of a preferred embodiment of the invention below.

BRIEF DESCRIPTION OF THE DRAWINGS

The invention will now be described, by way of an example, with reference to the accompanying drawings, in which.

DETAILED DESCRIPTION OF PREFERRED EMBODIMENT

Figure 1:
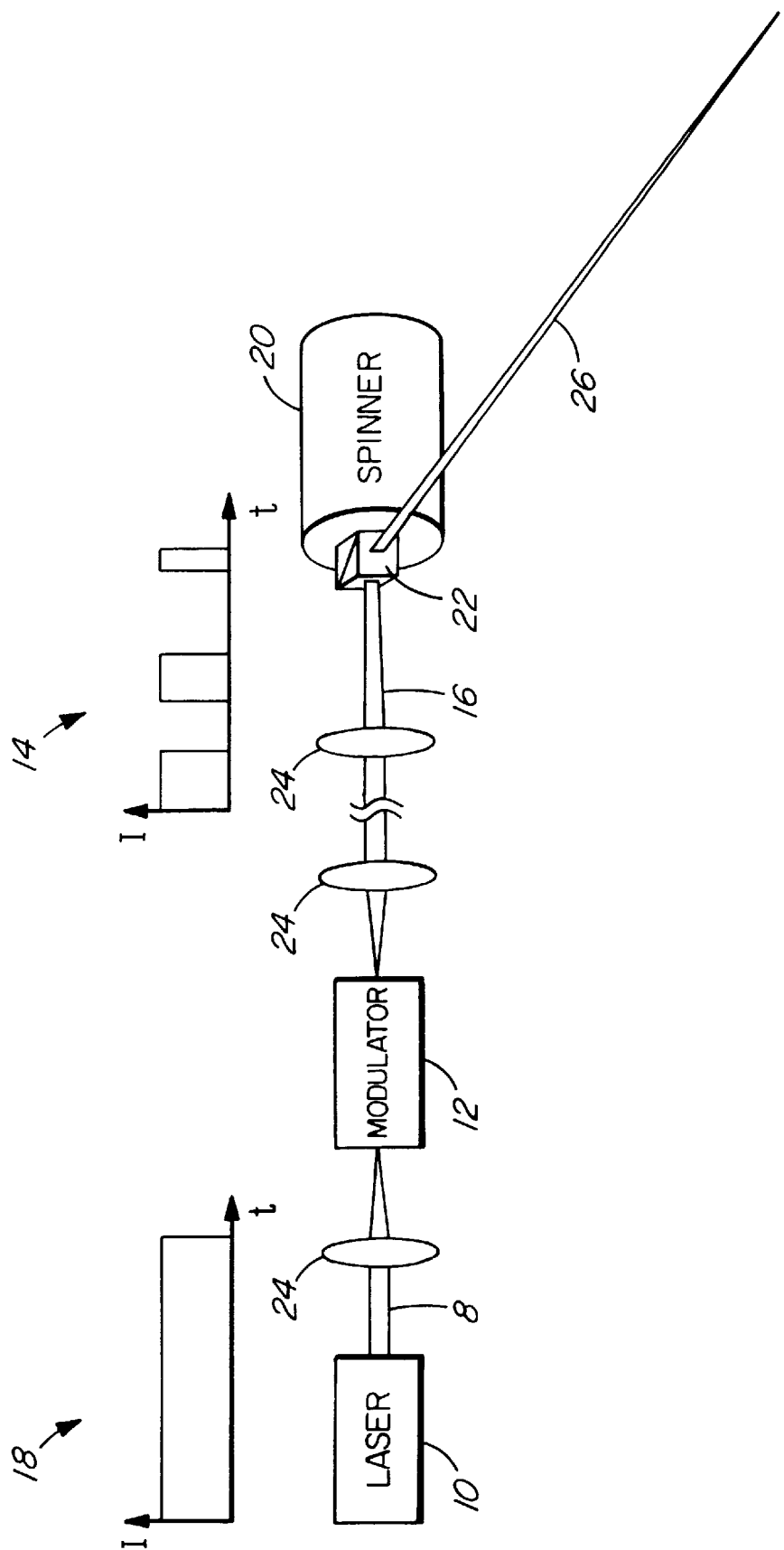
FIG. 1 is a diagrammatical representation of a conventional imaging arrangement using a modulator to encode a laser beam with information for forming an image on a printing medium.

Conventionally, transferring an image onto a printing medium is accomplished by focusing a light beam 8 from a light source 10, such as a laser, onto a modulator 12 of some kind, such as an electro- or acousto-optical modulator, as shown in FIG. 1. The modulator 12 encodes the light beam 8 with the information required to form the image. The result is a sequence of optical pulses which are varied in width and amplitude to form the picture elements (pixels) which form the image on the printing plate. This is illustrated graphically at 14 in FIG. 1. The modulated light beam is indicated by reference numeral 16. The unmodulated incoming beam 8 is in the form of a continuous wave, as graphically illustrated at 18. In both the graphical illustrations 14 and 18, intensity (I) is plotted against time (t).

The arrangement shown in FIG. 1 is that of an internal drum scanning system, with reference numerals 20 and 22, respectively indicating a spinner and a rotating optical element. Reference numeral 24 indicates lenses included in the system and the rotating light beam is indicated by reference numeral 26.

In order to achieve the best contrast ratio, i.e., on-off behaviour, for the modulated light and to eliminate continuous wave (cw) background and the associated fogging, it is customary to use only the 1st diffraction order of the modulated light. The 1st diffraction order of the modulated light is collimated, directed and focused to form a pixel on the printing medium. Since a significant amount of the incoming light is coupled into diffraction orders higher than the 1st, use of only 1st order light results in a system efficiency loss of about 30–40%.

Figure 2:
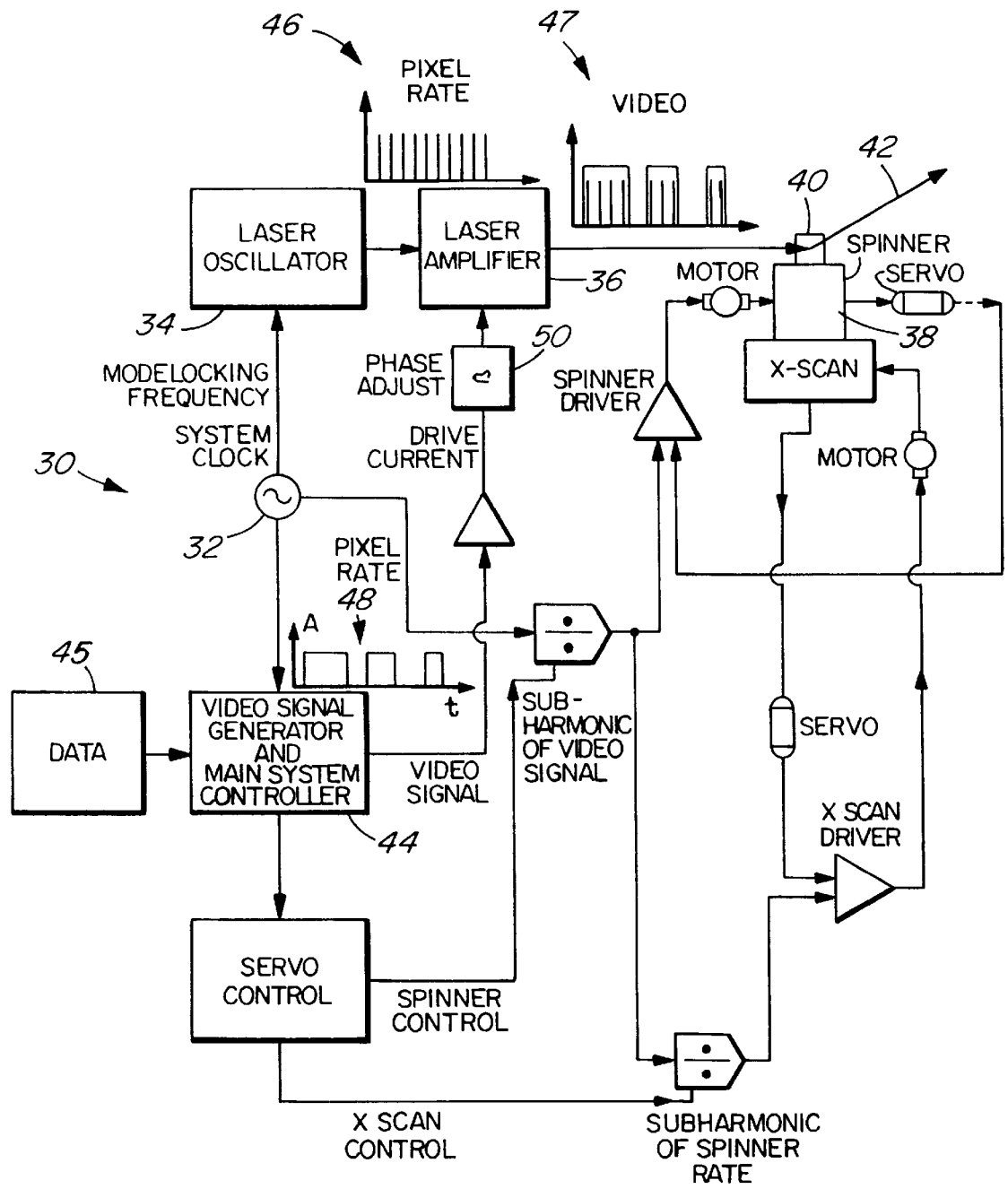
FIG. 2 is a diagram of an imaging system according to the invention.

This problem is alleviated with the imaging system according to the present invention, a specific embodiment of which is generally indicated by reference numeral 30 in FIG. 2.

The system 30 comprises a system clock oscillator 32, a diode laser oscillator 34 and a diode laser amplifier 36. In this example the system is shown using an internal drum scanning system having a spinner 38 and an associated rotating optical element 40 for producing a rotating laser beam 42 for writing an image on a flexible printing medium (not shown). The system 30 also includes a video signal generator and controller 44 for receiving input image data 45 for transferring onto the printing medium.

The system 30 also includes the conventional cross-scan and longscan drive arrangements for the internal drum scanning system which are controlled by the system clock 32 but these will not be described in any further detail.

The output of the system clock 32 is connected to the laser oscillator 34 and to the video signal generator 44.

The timing of the system 30 is controlled by the system clock 32, the output of which is amplified and used to drive the laser oscillator 34. The clock 32 operates at a modelocking frequency. Setting the spacing of the resonator forming mirrors (indicated at 52 in FIG. 3) of the laser appropriately for the modulation drive frequency of the laser, results in the generation of a stable train of modelocked pulses with a fixed phase and amplitude relationship. This train of pulses is illustrated graphically at 46 in FIG. 2. The repetition rate of the modelocked pulses is a harmonic frequency of the pixel rate used to image onto the printing medium.

The optical output of the laser oscillator 34, in the form of the train of modelocked pulses, is imaged into the amplifier 36. The amplifier 36 either blocks or amplifies the pulse train, depending on whether a drive signal from the video signal generator 44 is applied or not. This produces a gated and amplified pulse train which is graphically illustrated at 47 in FIG. 2. This pulse train forms the input for the rotating optical element 40 for producing the rotating laser beam 42 which produces the image on the printing medium.

The drive signal for the amplifier 36 is derived through mixing the output of the system clock 32 with the incoming data signal to create gate pulses of variable length for the amplifier 36. The gate pulses, graphically illustrated at 48, act as the video signal for the imaging signal. Prior to being applied to the amplifier 36, the gate pulses are phase shifted, as indicated at 50, to synchronize the rising edges of the modelocked pulse train from the oscillator 34 with the rising edge of the video signal. It is necessary that the video signal arrives earlier than the modelocked pulses to create the appropriate gain for the amplification of the modelocked signal.

Figure 3:
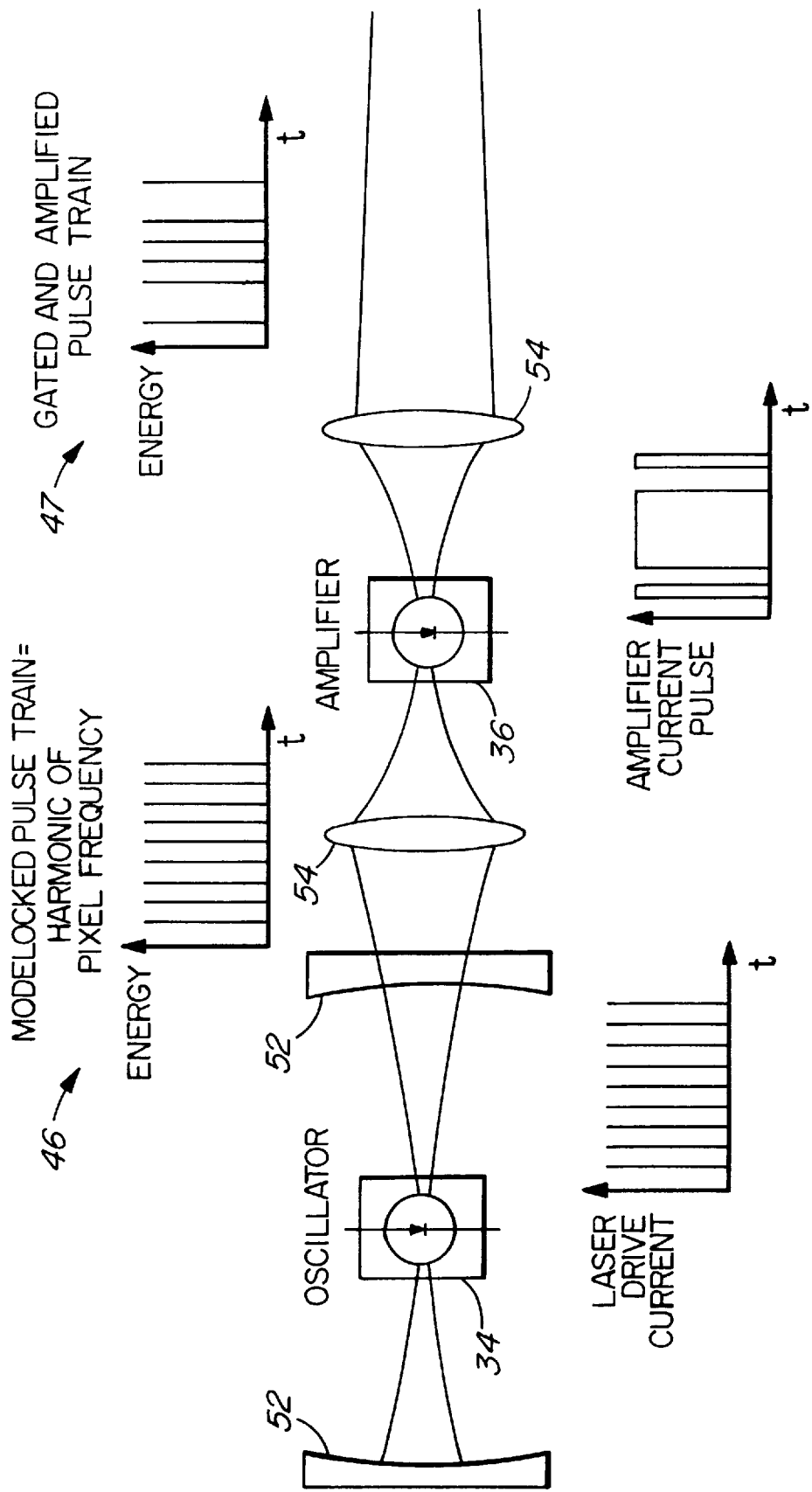
FIG. 3 is a diagrammatical representation illustrating the working of an oscillator/amplifier arrangement of the imaging system of FIG. 2.

The operation of the oscillator—amplifier combination of the present invention is illustrated in FIG. 3. The oscillator 34 and the amplifier 36 are shown, as well as a pair of concave resonator mirrors 52 and a pair of focusing lenses 54 forming part of the optical system.

The oscillator 34 produces a train of modelocked pulses as graphically illustrated at 46 in FIG. 3. The train of pulses is focused on the amplifier 36 by means of one of the lenses 54. The amplifier 36 either amplifies a pulse or acts as a perfect attenuator, by which the pulse is completely blocked, depending on whether a drive signal from the generator 44 is being applied or not. Thus, the result is a gated and amplified pulse train, as graphically illustrated at 47 in FIG. 3.

The amplifier 36, therefore acts as an external gate with built-in gain. When there is no power applied to the amplifier 36 it works as a perfect attenuator, while it acts as an amplifier with a high gain when a pulse is applied. The amplitude of the electrical pulse from the generator 44 feeding the amplifier 36 determines the gain and the duration of the gate pulse from the generator 44 determines the number of amplified pulses in the resulting amplified gate pulse.

Each gate pulse, i.e. the pulses as shown enclosed in a rectangle in the graphical illustration 47 in FIG. 2, is composed of one or more of the modelocked pulses which has been amplified by the amplifier 36. This amplification is greater than a factor of 100 in the present example. By using the gated modelocked pulses the rise time of the exposure is maintained at less than one tenth of the total exposure duration.

Figure 4:
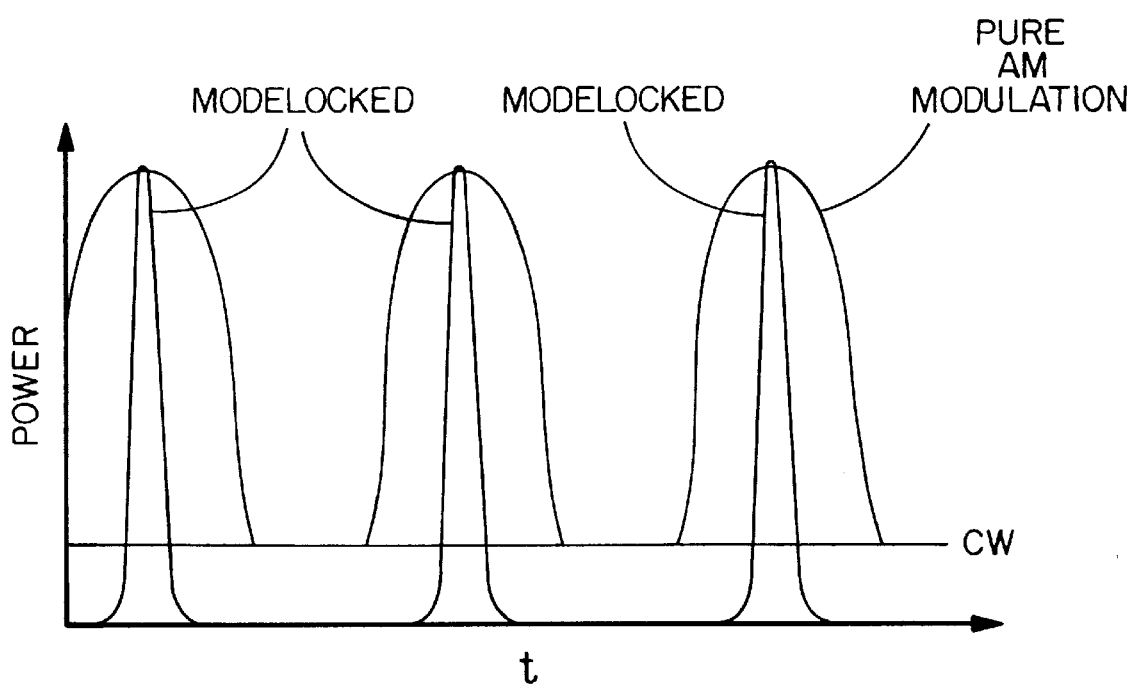
FIG. 4 is an illustration of a series of modelocked diode laser pulses used in the method of the present invention.
Figure 5:
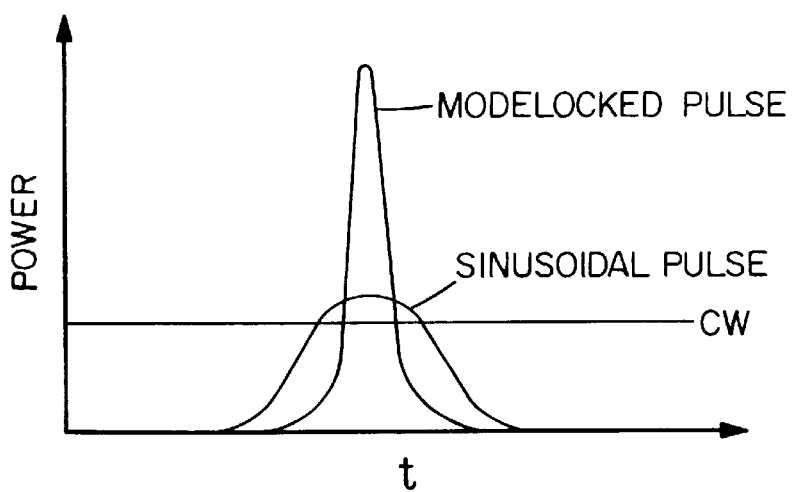
FIG. 5 is a graphical illustration of a modelocked pulse as compared with a sinusoidal pulse.

The modelocked pulses are of high intensity, i.e. the photons are concentrated in time as compared with the constant wave mode as shown in FIG. 4 or a sinusoidal pulse, as shown in FIG. 5.

The use of modelocked pulses provides for the efficient transfer of an image onto a printing medium at high speed, using reduced laser power.

From FIG. 5 it can be seen that the relatively low power of the continuous wave laser is increased substantially over the continuous wave and also over a sinusoidal wave.

Each gate pulse which is composed of a plurality of the modelocked pulses is applied to the printing medium in a quick succession of separate pulses.

Thus the exposure of different pixels or dots on the printing medium is accomplished by varying the number of equal amplitude pulses produced by the modelocked laser instead of changing the amplitude of a long duration pulse as is the case with the prior art methods.

The thermal medium is therefore exposed to very short high intensity pulses. This counteracts the energy loss due to lateral and axial thermal diffusion into areas that are not contributing to dot formation, like the metallic backing and the polymer material that has not reached the threshold value.

Figure 6:
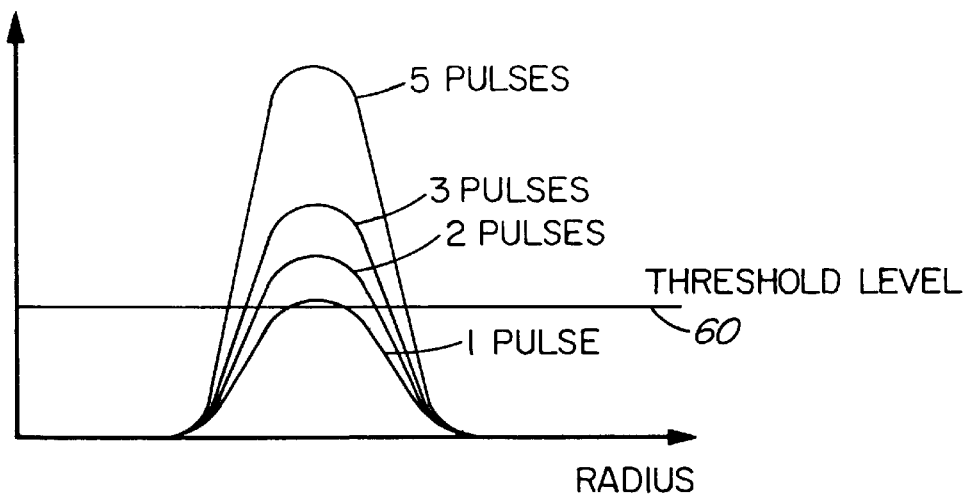
FIG. 6 is a graphical illustration showing dot size as a function of the number of pulses producing the dot or pixel.
Figure 6:
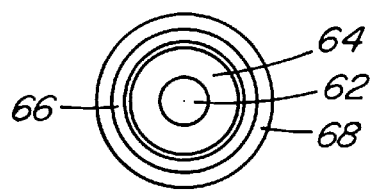

The number of pulses determines the size of the dot or pixel which is formed on the printing medium, as shown in FIG. 6.

Thermally induced printing media utilize emulsions which react to the thermal load imparted and will undergo a permanent state change, such as ablation, or solidification only when a certain temperature threshold has been exceeded. If the thermal load is allowed to dissipate before the threshold is reached, no change to the material will occur.

In FIG. 6, reference numeral 60 indicates the threshold level of the thermal printing medium. The application of one modelocked pulse exceeds the threshold level to the extent as shown and produces a dot or pixel size as indicated at 62. The application of two successive pulses produces a dot size as shown at 64. Similarly the application of 3 and 5 successive pulses produces dot sizes as indicated at 66 and 68, respectively.

A further aspect of the invention is that the amplitude of the pulses can be adjusted to control the thickness of the phase change layer and to avoid ablation of the material when it is not desired.

Figure 7:
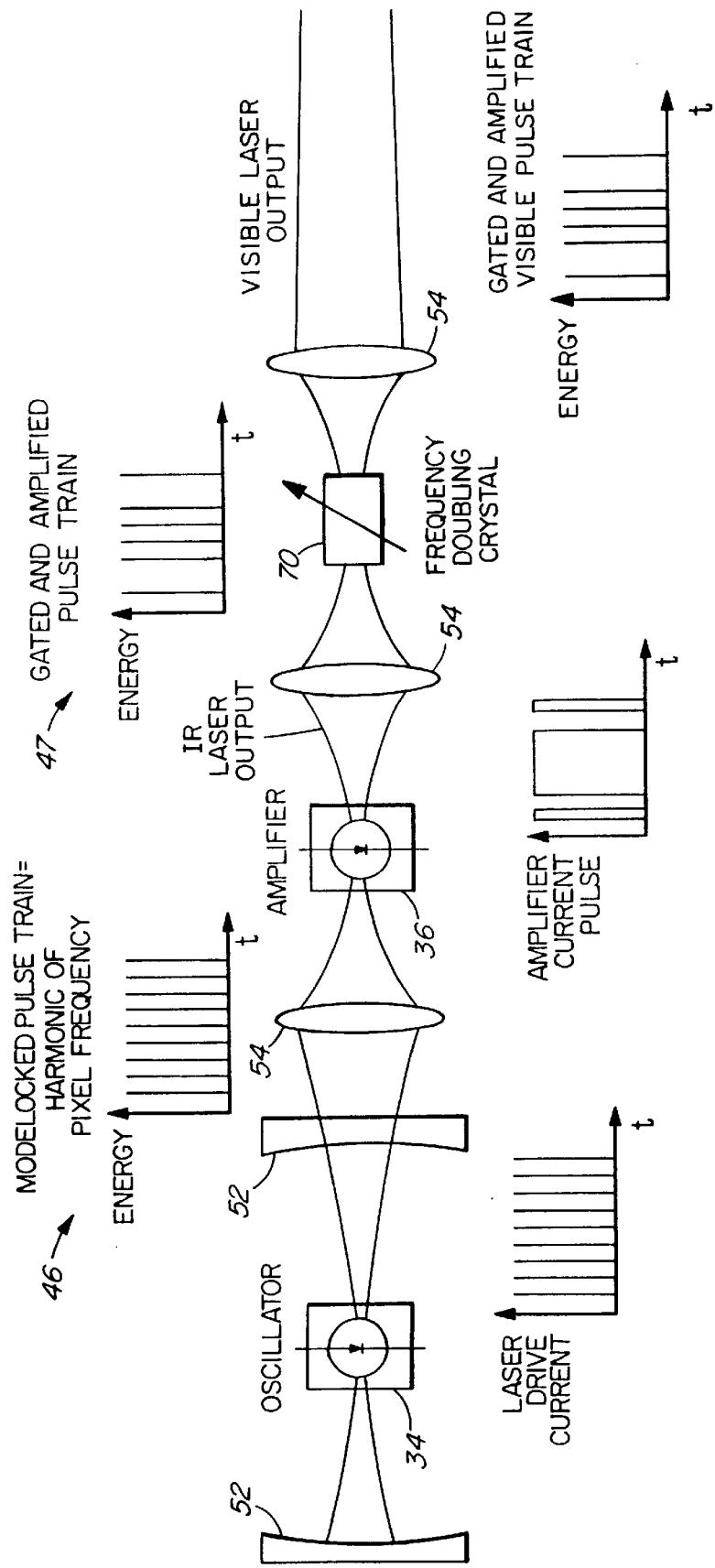
FIG. 7 is a diagrammatical representation illustrating another embodiment of the invention.

In FIG. 7 a further embodiment of the invention is shown. Parts of the system which correspond with those of the system of FIG. 3 are given like reference numerals. In this embodiment a frequency doubling crystal 70 is used to convert the infrared laser output from the amplifier 36 to visible laser output in the wavelength range of about 415–540 nm.

For example, this can be achieved with a non linear crystal using the $I^2$ dependence of the second order non linear susceptibility of the crystal material. The appropriate diode and non linear crystalline materials can be selected to obtain the desired output.

In providing for the use of either infrared or visible light, the invention enables the exposure of both thermal (infrared) and photopolymer and silver halide printing materials (visible wavelength range).

While only preferred embodiments of the invention have been described herein in detail, the invention is not limited thereby and modifications can be made within the scope of the attached claims.

What is claimed is:

1. A method of producing high constrast dot on a thermal printing medium having a threshold for thermal dot formation with steep Gamma behaviour, comprising the steps of:

producing a pulse train of modelocked diode laser pulses;

providing a source of image input data as a series of gate pulses of variable length; and modulating said pulse train with reference to said gate pulses to produce a gated pulse train for producing the high contrast dots on the printing medium; wherein the gated pulse train comprises a succession of gates, each gate comprising one or more separate pulses, and wherein each pulse exceeds the threshold for dot formation and the sum over the pulses in a gate determines the size of a dot produced by the pulses in that gate.

2. The method according to claim 1, wherein modulating said pulse train with reference to said gate pulses is effected by means of amplifying means, said gated pulse train serving to drive said amplifying means by successively applying said gate pulses to the amplifying means, whereby said amplifying means is triggered either to amplify said pulse train during the application of a gate pulse or to block said pulse train during the absence of a gate pulse.

* * * * *